Aug. 21, 1956  G. E. THORNTON ET AL  2,759,590
CONVEYOR FOR HIGH SPEED LIDDER

Original Filed Feb. 9, 1950  10 Sheets-Sheet 1

INVENTORS:
GARNO E. THORNTON
ERNEST A. VERRINDER
GLENN E. STILWELL
EARLE J. McGRATH
JOHN R. RICHARDS

BY Hans G. Hoffmeister
Attorney

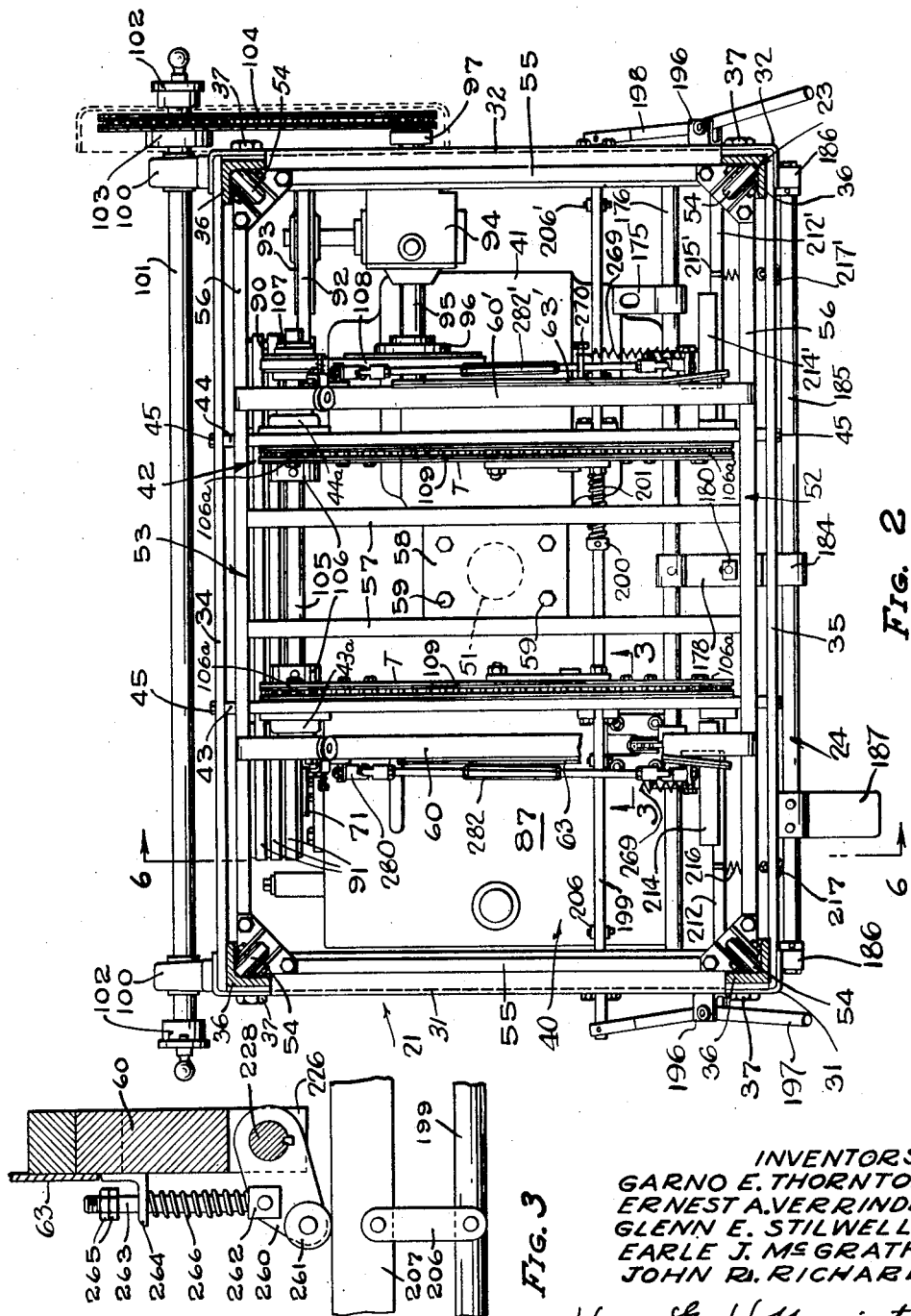

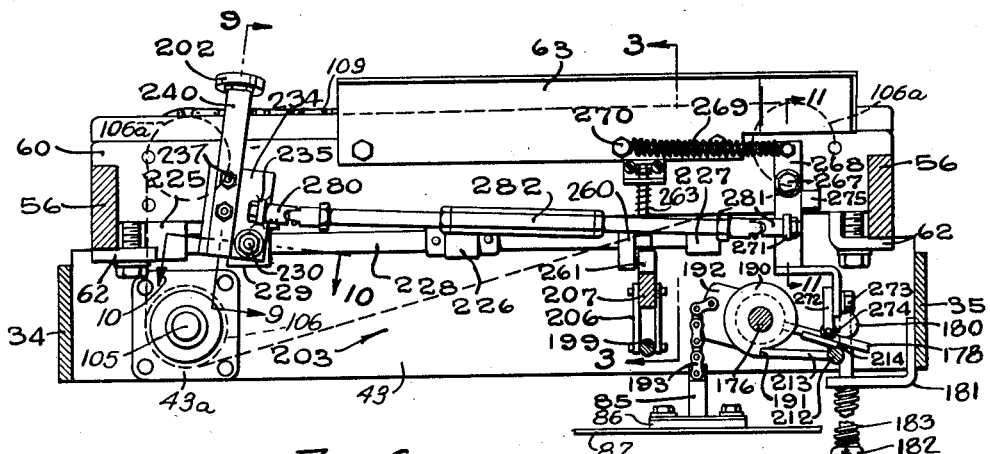
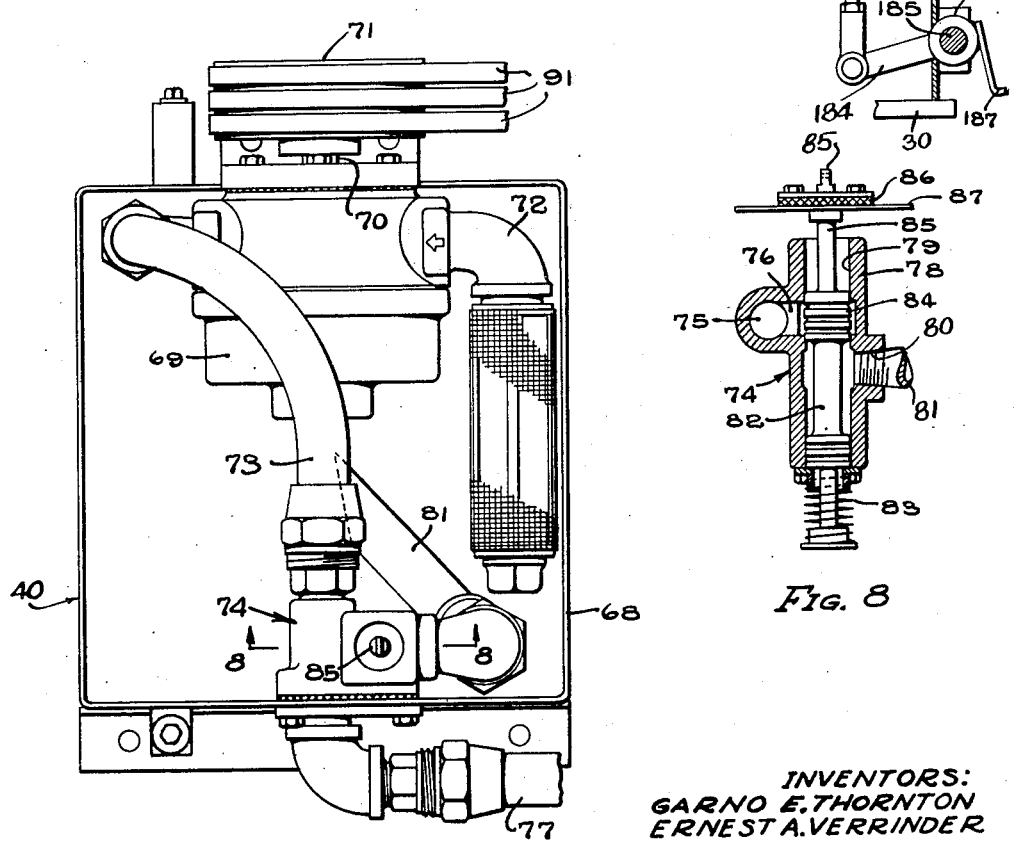

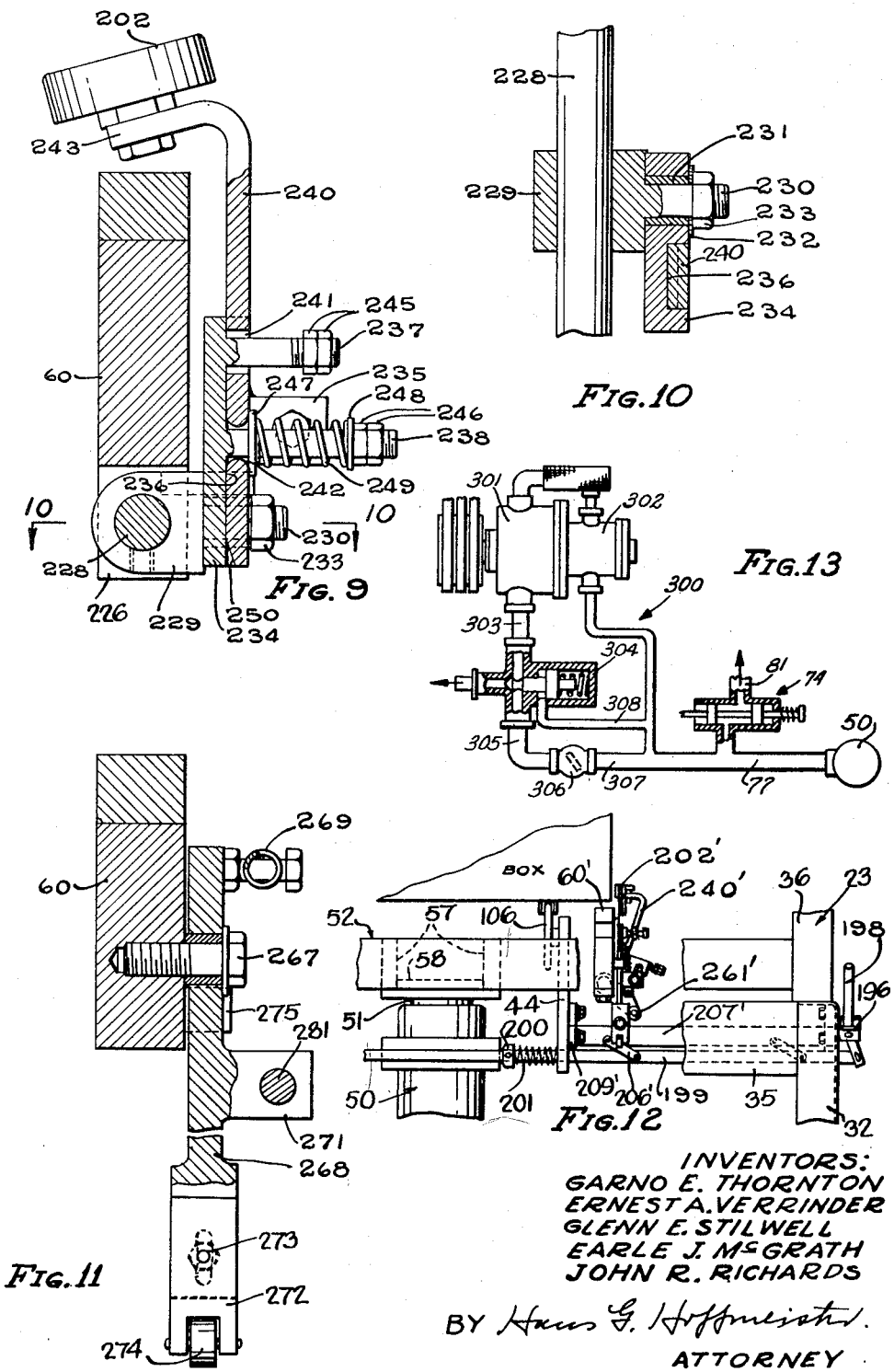

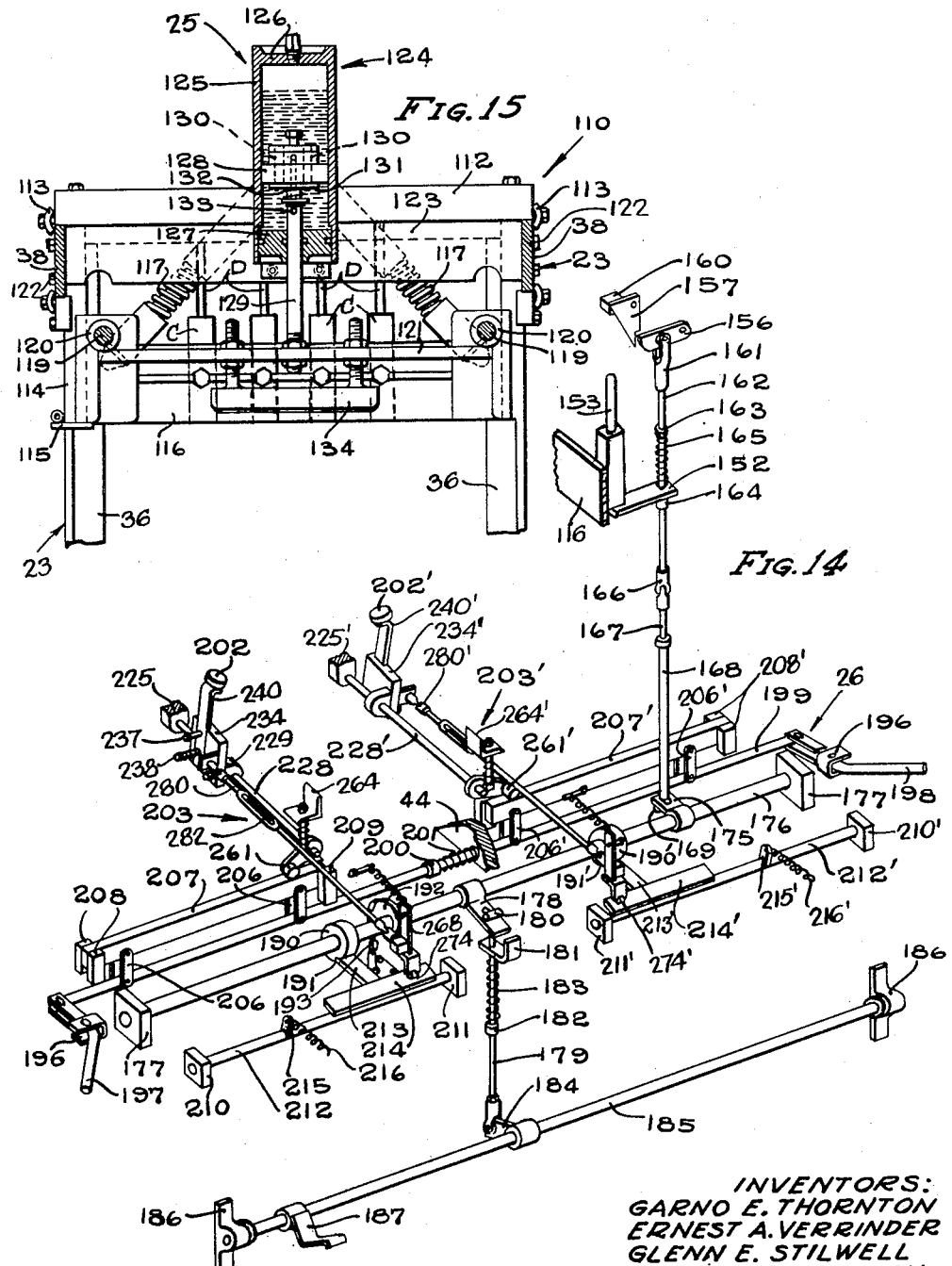

INVENTORS:
GARNO E. THORNTON
ERNEST A. VERRINDER
GLENN E. STILWELL
EARLE J. McGRATH
JOHN R. RICHARDS
BY Hans G. Hoffmeister
ATTORNEY

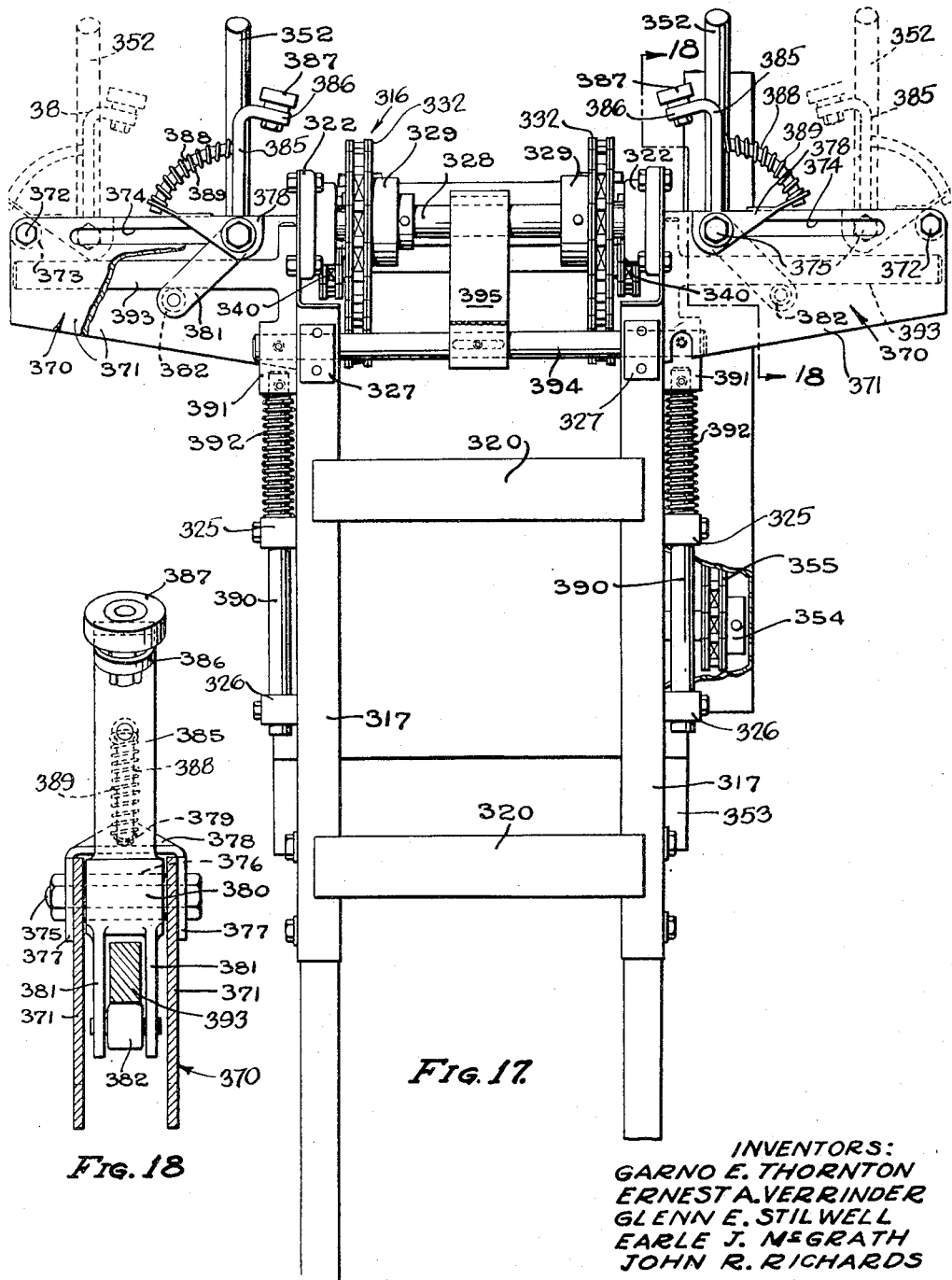

INVENTORS:
GARNO E. THORNTON
ERNEST A. VERRINDER
GLENN E. STILLWELL
EARLE J. McGRATH
JOHN R. RICHARDS
BY Hans G. Hoffmeister
ATTORNEY

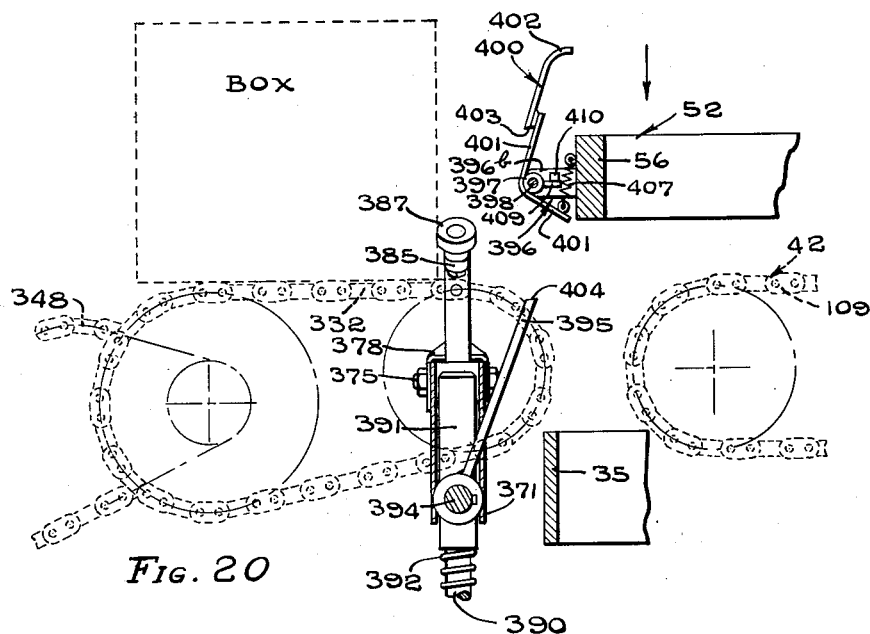
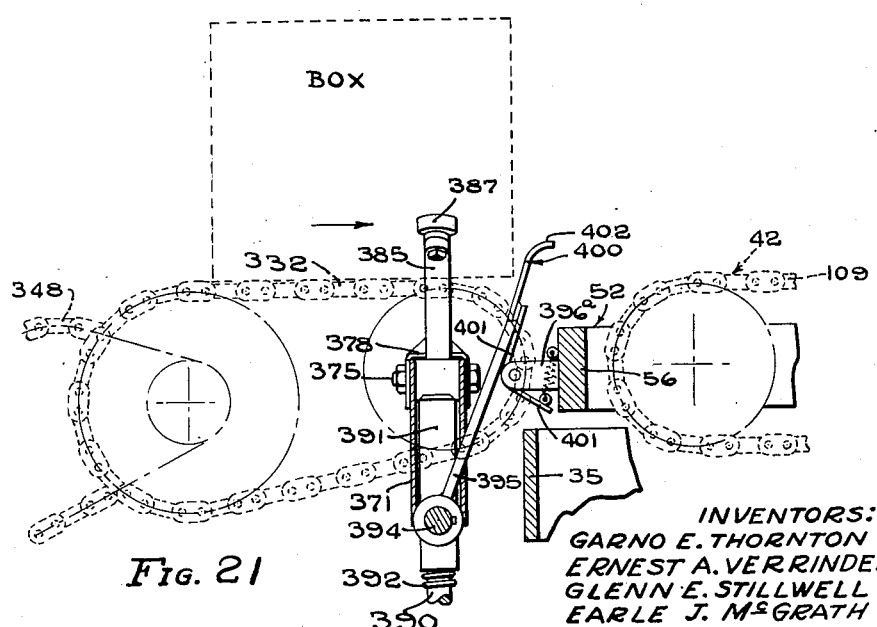

United States Patent Office
2,759,590
Patented Aug. 21, 1956

2,759,590

CONVEYOR FOR HIGH SPEED LIDDER

Garno E. Thornton, Colton, and Ernest A. Verrinder, Glenn E. Stilwell, Earle J. McGrath, and John R. Richards, Riverside, Calif., assignors to Food Machinery and Chemical Corporation, San Jose, Calif., a corporation of Delaware Original application February 9, 1950, Serial No. 143,322. Divided and this application December 13, 1952, Serial No. 325,852

5 Claims. (Cl. 198—34)

This invention relates to improvements in article conveying apparatus, and more particularly concerns improved conveying apparatus for feeding containers, such as filled wooden boxes, to a lidding machine.

This application is a division of our copending application, Serial Number 143,322, filed February 9, 1950, and entitled High Speed Lidder, and now Patent No. 2,630,566.

An object of the present invention is to provide a novel box feeding conveyor arranged to accumulate a supply of boxes to be lidded and to feed one of the boxes to the lidding machine immediately after a preceding box has been lidded and moved out of the machine.

A further object of the present invention is the provision of a box-feeding conveyor having stop means to control the spacing of the boxes as they pass through the lidding machine.

Another object is to provide a box feeding conveyor that has stop means controlling the feeding of boxes to the lidding machine, said stop means being adjustable to accommodate boxes of varying sizes.

Other and further objects, features, and advantages of the present invention will be apparent to one skilled in the art from the following detailed description taken in connection with the accompanying drawings.

Fig. 2 is an enlarged horizontal sectional view taken on the line 2—2 of Fig. 1.

Fig. 3 is an enlarged fragmentary detailed view taken on the line 3—3 of Fig. 2 and showing the device for yieldably withdrawing the stops from the path of boxes as a lidding cycle is started.

Fig. 6 is an enlarged transverse vertical sectional view taken on the line 6—6 of Fig. 2, and diagrammatically illustrating the stop and elevator control mechanism.

Fig. 7 is an enlarged plan view of the hydraulic pump unit of the machine and is taken approximately on the line 7—7 of Fig. 1 with the lid of the liquid tank containing said unit removed therefrom.

Fig. 8 is a vertical sectional view of the control valve of said hydraulic unit and is taken on the line 8—8 of Fig. 7.

Fig. 9 is an enlarged sectional detail view of one of the stops of the invention and is taken on the line 9—9 of Fig. 6.

Fig. 10 is a fragmentary detail view taken on the line 10—10 in Figs. 6 and 9.

Fig. 11 is an enlarged vertical sectional detail view taken on the line 11—11 of Fig. 6.

Fig. 12 is a fragmentary view similar to the right half of Fig. 4 and illustrates the operation of the device for withdrawing the stops from the path of boxes to permit these to travel straight through the machine without being lidded.

Fig. 13 is a diagrammatic view of a modified hydraulic system which is used in said machine.

Fig. 14 is a diagrammatic perspective view of the control system of the invention.

Fig. 15 is a fragmentary cross-sectional view taken on the line 15—15 of Fig. 1 and shows the chuck beam controlling dash-pot of the invention.

Fig. 17 is substantially a front elevational view of the accumulator conveyor shown in Fig. 16, and is taken on the line 17—17 thereof.

Fig. 18 is an enlarged detail sectional view taken on the line 18—18 of Fig. 17 and showing one of the shiftable stops provided on the aforesaid accumulator conveyor.

Fig. 20 is a fragmentary, more or less diagrammatic side elevation of the delivery end of the accumulator conveyor, showing the relative positions of a latching member, carried by the nailing table, and a box stop mechanism, carried by the conveyor, as the nailing table is being lowered after a preceding box has been lidded.

Fig. 21 is a fragmentary, more or less diagrammatic side elevation, similar to Fig. 20 but showing the positions of the members just after the stop mechanism has been retracted to permit a box to move from the accumulator conveyor into the lidding machine.

Figure 1:
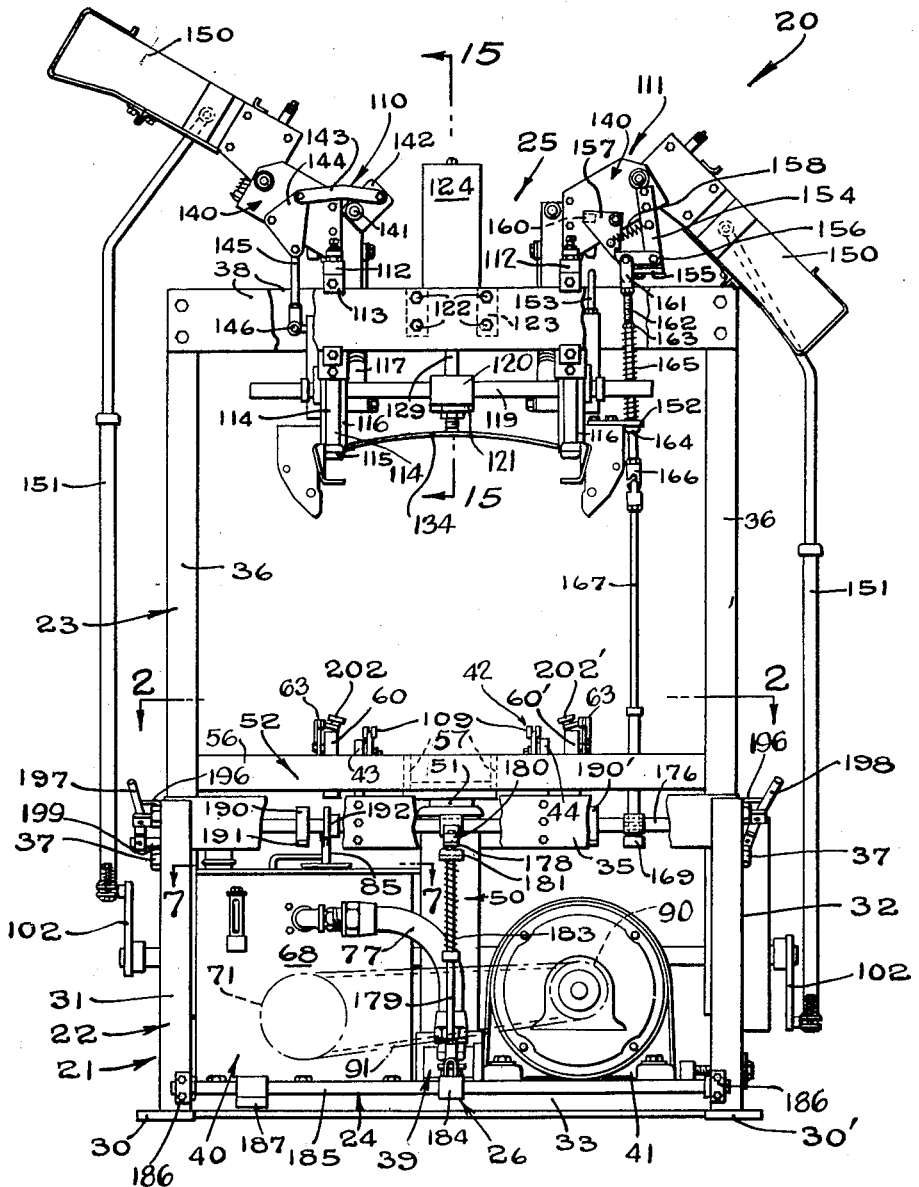
Fig. 1 is a front elevational view of a preferred embodiment of the invention.

Referring specifically to the drawings, the invention is there shown as embodied in a high speed lidder 20 (Fig. 1) having a frame 21 which includes a base structure 22 and a superstructure 23. Mounted on the base structure 22 is a box conveying and elevating mechanism 24. Mounted on the super-structure 23 is a lid holding and nailing mechanism 25. Associated with mechanisms 24 and 25 for controlling the operation thereof is a control system 26 (Fig. 14).

The frame 21

The frame base structure 22 (Fig. 1) includes foot plates 30 from which base standards 31 and 32 extend upwardly. Opposite ends of a mounting platform 33 (Fig. 1) rest on and are welded to said foot plates. Upper ends of the standards 31 and 32 are welded to horizontal plates 34 and 35 (Fig. 2).

The frame superstructure 23 includes four angle iron posts 36 (Fig. 1), the lower ends of which fit into the four corner angles of the base structure 22 and are adjustably secured thereto by bolts 37 (Fig. 2) so as to vary the height that the nailing mechanism is supported above the base structure 22.

Upper ends of the front pair of corner posts 36 and of the rear pair of said posts are connected together by longitudinal members 38.

Box conveying and elevating mechanism 24

Included in the elevating mechanism 24 (Fig. 1) is a hydraulic jack 39 (Fig. 1), a hydraulic pump unit 40, and an electric motor 41, all of which are mounted on the mounting platform 33. The mechanism 24 also includes a chain conveyor 42 (Fig. 2) which is mounted on a pair of transverse bars 43 and 44, opposite ends of which abut against horizontal plates 34 and 35 and are secured thereto by cap screws 45.

Hydraulic elevator 39

This includes a jack 50 (Figs. 5 and 12), with a plunger 51 upon the upper end of which is mounted a nailing table 52. The nailing table has a rectangular frame 53 (Fig. 2) which fits closely within the inner angles of the corner posts 36 and is held out of engagement with said posts, and guided vertically thereon, by rollers 54 mounted on the four corners of the frame 53.

Frame 53 includes end bars 55 and front and rear bars 56 (Fig. 2), the latter resting in their lower positions on the fixed bars 43 and 44 (Fig. 5) and being connected centrally by a pair of bars 57 which are welded thereto and to a plate 58 which is secured by bolts 59 to a flange 58a provided on the top of the jack plunger 51. Supported on the front and rear bars 56 (Fig. 2) is a pair of anvil bars 60 and 60' opposite ends of the latter extending over and resting on the bars 56 and being secured thereto by clamps 62 (Fig. 6) which are provided on the bars 60 and 60' and engage the under faces of the bars 56. The bars 60 and 60' are provided with box guides 63 (Fig. 5) which are adapted to center a box on the anvil bars 60 and 60' when these bars are properly spaced apart for receiving a box of that particular length.

Hydraulic pump unit 40

This unit (Fig. 7) is enclosed in a rectangular tank 68 and includes a pump 69 located within and mounted on one wall of this tank, the shaft 70 of said pump extending outside of said tank and carrying a triple sheave 71. The pump 69 has a screened suction intake 72 and a discharge pipe 73 which connects with a valve 74 to discharge liquid into valve passage 75 (Fig. 8) which has a by-pass opening 76 and connects with a pipe 77 which leads to the lower end of the jack 50 (Fig. 1).

The valve 74 (Fig. 8) has a body 78 with a vertical valve bore 79 with which the by-pass passage 76 connects, and which also has a threaded by-pass outlet opening 80 into which a pipe 81 fits which discharges into the tank 68 (Fig. 7). The valve 74 has a spool plunger 82 which is held downwardly yieldably by a spring 83 in a closed position in which an upper piston 84 of the plunger 82 covers and closes the by-pass opening 76. Extending upwardly from the plunger 82 is a control stem 85 which extends through packing 86 mounted on the cover 87 of the tank 68. It is thus clear that with the valve plunger positioned as shown in Fig. 8 fluid discharged from the pump 69 passes through the valve 74 and into the jack 50 to cause the nailing table 52 to be lifted by this jack. When the spool plunger 82 is raised to connect the by-pass opening 76 with the by-pass outlet 80 and discharge pipe 81, the pump fluid by-passes into the tank 68 and, if the nailing table 52 is raised, this descends, forcing the liquid in the jack 50 below the plunger 51 outwardly through the pipe 77, passage 76, bore 79, outlet 80 and pipe 81 of the valve 74 into the tank 68.

Motor 41

This motor (Fig. 1) has a quadruple sheave 90 (Fig. 2) which is radially aligned with and connected to the pump sheave 71 by V-belts 91. A fourth belt 92 connects the sheave 40 with a single sheave 93 of a gear box 94 mounted on the base structure standard 32 and which in turn drives a shaft 95 having a sheave 96. The shaft 95 also extends outwardly through the standard 32 where it carries a sprocket 97.

Mounted in bearings 100 (Fig. 2) is a nail hopper operating shaft 101 having cranks 102 at its opposite ends and a sprocket 103 which is radially aligned with and connected to the sprocket 97 by a chain 104.

The box conveyor 42 includes a shaft 105 (Fig. 2) which journals in suitable bearings 43a and 44a provided on the transverse bars 43 and 44, this shaft having sprockets 106 and a pulley 107, the latter being connected by a belt 108 to the pulley 96. Endless chains 109 are trained about sprockets 106 and suitable idle sprockets 106a which are mounted on inner faces of bars 43 and 44 at the opposite ends thereof.

The upper flights of chains 109 ride on suitable tracks T fixed on the bars 43 and 44 so as to provide horizontal support for boxes carried on said conveyor.

When the nailing table 52 is in its lowermost position as shown in Fig. 1, the box supporting surfaces of the upper flights of the conveyor chains 109 are disposed at a level slightly above the upper surfaces of the anvil bars 60 and 60' the purpose of this being made clear hereinafter.

Nailing mechanism 25

This includes two units 110 and 111 which are reverse duplicates of each other with the exceptions to be noted hereinafter. Each of the units 110 and 111 include a nail driver beam 112 (Figs 1 and 15) opposite ends of which rest on the members 38, and are secured thereto by clamps 113. Secured to each of the opposite ends of the beam 112 and extending downwardly therefrom just within the adjacent member 38 and clamped thereto is a gib bar 114 having a stop 115 on its lower end. Each beam 112 is provided with a bank of nail drivers D which extend downwardly therefrom.

Disposed between and slidable vertically on gib bars 114 is a chuck beam 116 which carries a bank of chucks C into which the aforesaid drivers slidably extend to drive nails therefrom as clearly illustrated in the aforesaid Paxton patent. A pair of compression spring elements 117 have their upper ends pivotally connected to a plate (not shown) which in turn is pivoted on the adjacent driver beam 112. The lower ends of the elements 117 are pivoted to opposite ends of the chuck beam 116. Mounted in suitable apertures provided in the chuck beams 116 of the units 110 and 111 are two shafts 119 on which are mounted collars 120 these collars being connected by a transverse bar 121 (Figs. 1 and 15). Extending between and secured to members 38 as by cap screws 122 are transverse bars 123 on which is mounted a dash pot 124 including a cylinder 125 having upper and lower heads 126 and 127 and a piston 128 mounted on a piston rod 129 which extends downwardly through the head 127 and is secured at its lower end to the transverse bar 121. Extending vertically through the piston 128 are by-pass passages 130 which are closed during downward movement of said plunger by a clapper valve 131 held upwardly against the bottom face of the piston by a spring 132. On the upward movement of the piston, this valve readily yields allowing fluid to by-pass the piston 128. Downward travel of the piston 128 and the cylinder 125 is retarded by the necessity for liquid contained in the cylinder beneath the piston to flow to the top side of the piston through a restricted passage 133.

Adjustably fixed upon the bar 121 (Figs. 1 and 15) and disposed just below this is a crown sheet 134 for shaping the lid of an overfilled box when this is being lidded.

Each of the nailing units 110 and 111 is supplied with nails in the well-known manner by a nail pick device 140 (Fig. 1) on which a pick bar 141 is pivotally mounted, this pick bar being rotated with each nailing operation by a ratchet arm 142, the latter being swung through a link 143 and a rocker 144 by a link 145 which is pivotally connected at 146 to the chuck beam 116 of that unit. This operation of the pick bar 141 feeds a nail to each of the chucks C on the chuck beam 116 following each nailing operation.

Fig. 1 shows the nail feeding mechanism just described on the front end of unit 110. A similar feeding mechanism is provided on the rear end of nailing unit 111. Nails are supplied to each of the pick devices 140 by nail hoppers 150 which are caused to perform this function by their being rocked by pitmans 151 pivotally connected at their upper ends thereto and at their lower ends to cranks 102.

Control system 26

Secured to the right chuck beam 116 of the unit 111 is an apertured rod guide 152 (Figs. 1 and 14) while extending upwardly from the same chuck beam is a release finger 153. Fixed on the nail feed 140 of unit 111 and extending downwardly therefrom is an arm 154 having an adjustable stop 155 fixed on the lower end thereof and pivoted thereto just above this stop is a dog 156. Pivoted on the same nail feed 140 is a trigger 157 which is yieldably held by a spring 158 to swing this trigger against and into the path of the dog 156 so as to limit the upward movement of the latter. The trigger 157 has a lug 160 thereon which is disposed directly above the finger 153 so that at the upper extremity of movement of the chuck beams 116 in a lidding operation, the finger 153 engages the lug 160 and swings the trigger 157 away from above the dog 156. The significance of this action will be made clear hereinafter.

Pivotally connected to the dog 156 by a clevis 161 at its upper end is a threaded rod 162 carrying a nut 163 and which extends downwardly through the apertured rod guide 152. This rod has a collar 164 beneath said guide and a compression spring 165 coiled thereabout between the nut 163 and the guide 152. At its lower end the rod 162 connects through a universal coupling 166 with a rod 167. At its lower end the rod 167 screws into a sleeve 168 having a cross-head 169 on its lower end.

Just above the cross-head 169, the sleeve 168 extends through an elongated aperture in an arm 175 (Figs. 1 and 14) extending rearwardly from a shaft 176, opposite ends of which journal in bearings 177 fixed on inner faces of base structure standards 31 and 32. The shaft 176 also has fixed thereon an arm 178 which extends forwardly and has an elongated aperture for receiving the upper end of a rod 179 having a cross-head 180 on the upper end thereof and which extends through an apertured guide 181, the latter being fixed on plate 35 and extending rearwardly therefrom.

Below guide 181 (Figs. 1 and 14) the rod 179 is provided with a collar 182 and has a compression spring 183 coiled thereabout between said collar and the guide 181. At its lower end the rod 179 pivotally connects with an arm 184 fixed on a pedal shaft 185, opposite ends of which journal in bearings 186 which are mounted on the base structure standards 31 and 32. Also fixed on shaft 185 and extending forwardly therefrom is a foot pedal 187, by which the control mechanism 26 is manipulated by the operator.

Also fixed on shaft 176 (Figs. 1 and 14) are lock collars 190 and 190' which are substantially cylindrical, but are milled away (Fig. 6) to form like lock shoulders 191 and 191' on the respective peripheral faces thereof.

Shaft 176 also carried a valve actuating arm 192 which extends inwardly therefrom and is connected by a short chain 193 (Fig. 6) to the upper end of the valve stem 85 (Figs. 6 and 8).

Pivoted in brackets 196 (Figs. 1, 2 and 14) fixed on the standards 31 and 32 are bell crank levers 197 and 198 corresponding ends of which are bifurcated and pivotally connected to opposite ends of a shaft 199.

Fixed on the shaft 199 near its middle in a collar 200 and coiled about this shaft between said collar and bar 44 is a coiled compression spring 201.

It is now desired to point out that box stops 202 and 202' are associated respectively with the anvil bars 60 and 60' and the system 26 includes stop control mechanisms 203 and 203' associated respectively with these stops and each of which is a reverse duplicate of the other. It is thus believed that a description of the stop control mechanism 203 will suffice for both of these mechanisms and it will be understood that reference to any element of the mechanism 203' will be by use of the same numeral as has been applied to the corresponding element of mechanism 203, with prime attached.

Stop control mechanism 203

Supported on the shaft 199 (Figs. 3 and 14) by pairs of links 206 and slidable vertically between the base standard 31 and 43 is a control track 207. Opposite ends of this track are guided by pairs of blocks 208 and 209 which are secured respectively to the base standard 31 and bar 43.

Pivotally mounted in bearings 210 and 211 which are secured respectively to the base standard 31 and bar 43 is a shaft 212 having welded thereto a latch 213 (Fig. 6), a cam 214, and a spring arm 215. Secured to said spring arm is a spring 216 which is also attached to a cotter 217 in the plate 35 (Fig. 2) so as to yieldably rotate the shaft 212 to hold the latch 213 against the lock collar 190.

Extending downwardly from the anvil bar 60 (see Figs. 3, 6, and 9) are bearings 225, 226, and 227 in which a shaft 228 journals. This shaft has fixed thereon a block 229 having a threaded stud 230 (Fig. 10). The stud 230 carries a sleeve 231 and a washer 232 and a nut 233. Freely rotatable about the sleeve 231 and trapped between the washer 232 and the block 229 is a block 234. The latter block has an apertured lug 235 welded thereon and a channel 236 milled in its outer face. Welded to the block 234 within the channel 236 are studs 237 and 238. Slidably fitting into the channel 236 is a stop mounting arm 240 having apertures 241 and 242 which loosely receive the studs 237 and 238. An upper end portion 243 of the arm 240 is bent downwardly and inwardly over the anvil bar 60 and has the stop roller 202 rotatably mounted thereon in a plane parallel with said end portion 243 (Fig. 9).

The stud 237 has lock nuts 245 for limiting play of the arm 240 thereon. The stud 238 has lock nuts 246 which trap washers 247 and 248 and a coiled compression spring 249 between said nuts and the stop mounting arm 240. The spring 249 yieldably holds the arm 240 in the channel 136 but permits it to rock outwardly therein until it engages the lock nuts 245. The lower end of the arm 240 is beveled as indicated at 250 (Fig. 9) to facilitate this rocking movement.

Also fixed on the shaft 228 (Fig. 3) is an arm 260 carrying a roller 261 which normally rides upon the control track 207. Pivoted on the arm 260 is a block 262 having a threaded stud 263 which extends upwardly through an angle bracket 264 secured on the anvil bar 60. The upper end of the stud 263 carries lock nuts 265. Trapped between the block 262 and the bracket 264 is a compression spring 266 which yieldably urges the arm 260 to swing downwardly and thus rotate the shaft 228 to swing the arm 240 and stop 202 mounted thereon outwardly from the position in which these parts are shown in Figs. 2, 3, 6, and 9.

Pivotally mounted on the anvil bar 60 by a cap screw 267 (Figs. 6 and 11) is a control lever 268, the upper end of which is connected by a contractile spring 269 to a screw 270 which helps secure box guide 63 in place on the anvil bar 60. The lever 268 has welded thereto a lug 271 and the lower end thereof has a foot piece 272 adjustably secured thereto by a cap screw 273. Mounted on the foot piece 272 is a roller 274.

Provided on the anvil bar 60 is a stop 275 against which the spring 269 swings the lever 268 as shown in Fig. 6. The foot piece 272 is vertically adjusted, when the lever is in this position, so that the roller 274 lightly rests on the cam 214 without actuating the latter.

Secured to the lugs 235 and 271 are flexible couplings 280 and 281 which are connected by a turnbuckle 282 whereby the rocking of the arm 240 by horizontal movement of the stop 202, when the latter is engaged by a box entering the machine, rotates the lever 268 and causes the roller 274 to depress cam 214 thereby rocking shaft 212 and pushing latch 213 downwardly out of engagement with shoulder 191 of the lock collar 190.

Operation

The lidder 20 may be hand-fed by the operator, from a gravity conveyor leading up to the machine, by pushing boxes onto the conveyor 42 so that these will be picked up by the chains 109 and carried therealong until the box engages the roller stops 202 and 202' with the latter positioned as shown in Figs. 2 and 6 and thus swing the stop mounting arms 240 and 240' to shift the rollers 274 and 274' against the cams 214—214' thereby rotating the shafts 212—212' and rotating the latches 213—213' to unlock the lock collars 190—190'. Nothing will happen in response to the series of actions just outlined unless and until the operator depresses the foot pedal 187. When this is done, the rod 179 is lifted thereby releasing the arm 178 from the cross-head 180 and permitting the spring 83 of the valve 74 to pull the valve plunger 82 downwardly into the position in which this is shown in Fig. 8. This action of the valve 74 takes place the instant that the shaft 176 is freed from restraint by the latches 213 and 213' and the cross-head 180 on the rod 179.

If the operator wishes the lidder to function immediately upon a box engaging the stops 202—202' and swinging these forwardly, he merely maintains his foot on the pedal 187 so as to keep the cross-head 180 constantly elevated so that the shaft 176 will be unrestrained when the latches 213 and 213' are lowered by the box engaging stops 202—202'.

As previously noted, the lowering of valve plunger 84 to the position in which this is shown in Fig. 8 closes the by-pass opening 76 in this valve, thereby propelling the oil discharged from the pump into the pipe 73 through the passage 75 into the pipe 77 and the bottom of the jack 50.

Actuation of valve 74, as shown in Fig. 8, to compel the liquid from the pump 69 to be delivered to the jack 50 causes the nailing table 52 to be rapidly lifted. This movement proceeds only a fraction of an inch before the anvil bars 60—60' rise into contact with the bottom of the box carried on the conveyor 42 so as to lift this box from the conveyor causing it to rest thereafter during the lidding operation on the anvil bars 60—60' (compare Figs. 4 and 5). The initial portion of the upward travel of the nailing table 52 also results in the rollers 261—261' being lifted out of engagement with the control tracks 207—207' with the result that the shafts 228—228' are rotated to swing the stops 202—202' outwardly from in front of the box resting on the anvil bars 60—60'. With the stop thus removed from in front of the box the springs 269—269' pull the stops 202—202' rearwardly alongside the box resting on the nailing table 52.

The elevator continues upwardly, it being understood that a lid has been positioned overlying the box and preferably resting on devices provided for supporting the lid in the proper position over the box as shown in the aforesaid U. S. Letters Patent to Hale Paxton.

The rising box is thus caused to engage the lid and the lid ends are compressed between the chuck beams 116 and the ends of the box to press these lid ends on the box ends and lift the chuck beams to drive nails through the lid ends into the box ends.

The rising of the chuck beams 116 during the lid nailing operation causes the piston 128 (Fig. 15) of the dashpot 124 to rise and the clapper valve 131 to open. The dash-pot 124 thus offers little resistance to the upward travel of the chuck beams 116. As these beams start upward, the rod guide 152 travels upward therewith thereby compressing the spring 165 against the nut 163 until a considerable upward pressure is built up against said nut. Upward movement of the rod 162 in response to this pressure is prevented by the dog 156 engaging the trigger 157 with the latter positioned as shown in Figs. 1 and 14.

At the completion of the upward movement of the nailing table 52, which takes place just as the nails are driven home through the lid ends as shown and described in said Paxton patent and into the box ends, the release finger 153 engages the lug 160 rocking the trigger 157 away from over the dog 156 whereupon the rods 162 and 167 and sleeve 168 are snapped upwardly under the pressure applied thereto by the spring 165.

This snap action is transmitted through the cross-head 169 and arm 175 to the shaft 176 to rotate the latter and lift the spool plunger 82 from the position in which it is shown in Fig. 8 to an upward neutral position permitting the liquid in the jack 50 beneath the plunger 51 to escape through the pipe 77, the opening 76, the valve bore 79, and pipe 81 into the tank 68 with relatively little restraint. This actuation of the valve thus results in the nailing table 52 and the lidded box resting thereon dropping rapidly. This rapid starting of the down movement of the elevator greatly increases the capacity of the machine. This could not be done, however, with the lid pressing and nailing mechanism 25 free to follow the box downwardly at such a rapid rate, as the impact of the chuck beams 116 against the stops 115 at the lower end of the gib bars 114 would produce an intolerable noise and vibration and produce strains resulting in rapid wear and frequent breakage of parts thus subjected to undue strain. To avoid these things and facilitate the elevator descending at the maximum practical speed, the dash-pot 124 is provided to retard the return downward of the nail chucks 116 whereby these are gently lowered until they come to rest against the stops 115 while the box leaves contact with the chuck beams 116 immediately upon the operation of the snap action valve control as above described.

Figure 4:
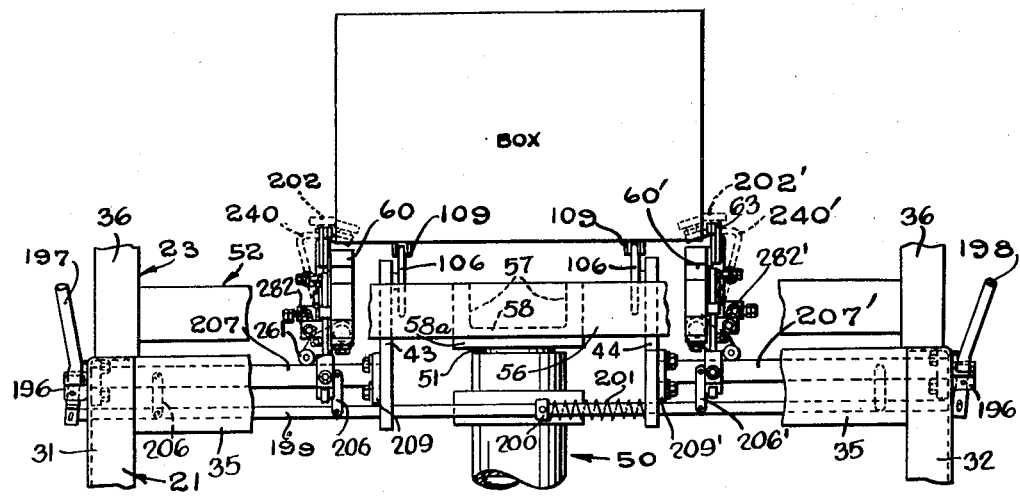
Fig. 4 is an enlarged fragmentary view of a portion of Fig. 1 with parts of the structure broken away to illustrate the box stop mechanism, seen from the front, with a box stopped in the proper position for initiating a lidding operation, but prior to the start of that operation.

It is to be noted that the mechanism 203 and 203' each act to latch the valve 74 in neutral position and the shaft 176 will not be freed so that it may be rotated by the valve spring 83 until both of the stop control mechanisms 203 and 203' are actuated by a box engaging and shifting both of the stops 202 and 202', as shown in Fig. 4. This assures that a lidding operation will not be performed upon a box until it is properly positioned in the machine.

Figure 5:
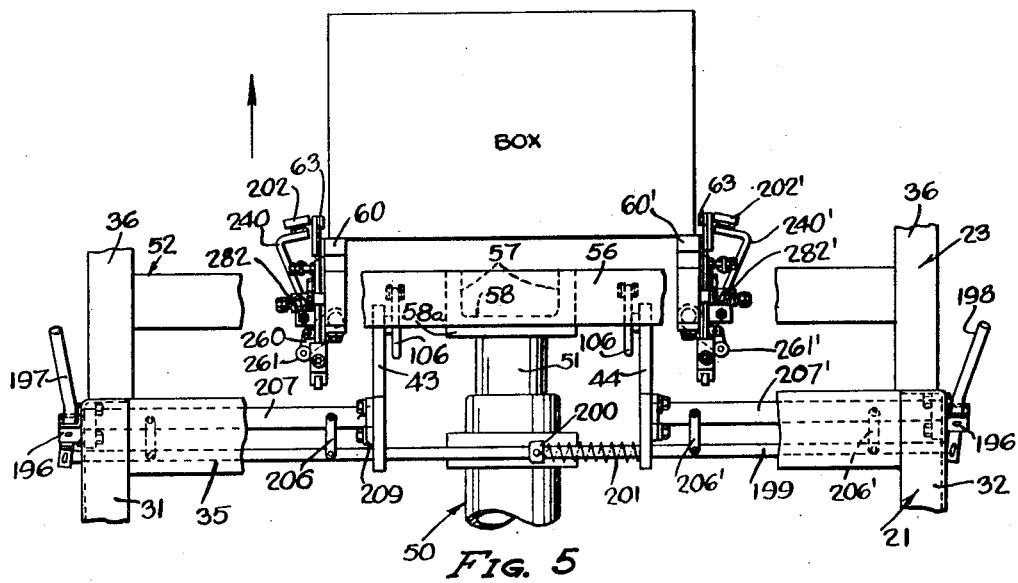
Fig. 5 is a view similar to Fig. 4 showing the nailing table of the machine starting upward with a box resting thereon and with the stops withdrawn from the path along which said box will be discharged after it has been lidded.

Occasionally, filled boxes which it is not desired to lid are placed on the same conveyor with boxes to be lidded. Provision is made in the lid nailing machine 20 for quickly disposing the stops 202 and 202' out of the path of boxes which are not to be lidded so that these will rapidly pass through the machine and then for re-disposing these stops for automatically operating the machine when the next box is delivered thereto. This control of the stops 202 and 202' is accomplished by seizing either of the bell crank levers 197 or 198 and shifting the shaft 199 to lower the control tracks 207 and 207' as shown in Fig. 12. This moves these tracks away from the rollers 261 and 261' whereby the springs 266 and 266' are permitted to rotate the shafts 228 and 228' and swing the roller mounting arms 240 and 240' outwardly, as shown in this figure. When it is desired to restore the stops 202 and 202' to operative positions, the shaft 199 is shifted back to its normal position in which it is shown in Figs. 4, 5, and 14 by manipulation of one of the levers 197 or 198.

The lid pressing and nailing machine 20 is adjustable to handle boxes varying in length, width, and height. To change from lidding a box of one length to lidding a box of a different length involves shifting the nailing units 110 and 111 on the horizontal superstructure members 38 and shifting the anvil bars 60 and 60' on the nailing table 52. These adjustments are fairly easy of accomplishment because of the nailing units 110 and 111 being secured to the frame bars 38 by clamps 113 which can readily be released and then tightened after the adjustment has been made. The same is true of the anvil bars 60 and 60' which are secured in place on the longitudinal nailing table frame members 56 by clamps 62.

It is to be noted that when the anvil bars 60 and 60' are thus shifted to vary their spacing on the nailing table 52, no attention need be paid to the mechanisms 203 and 203' as these are designed to be operative in all adjusted positions of the anvil bars 60 and 60'.

When changing from boxes of one width to a different width the position of the stops 202 and 202' must be changed, this being accomplished by shifting the blocks 229 and 229' on the shafts 228 and 228' and adjusting the length of the turn-buckles 282 and 282' accordingly. The chucks C which are mounted on the chuck beams 116 are adjustable longitudinally thereon and the drivers D are likewise slidable on the driver beams 112 as shown in said Paxton patent so that the proper disposition of the drivers and chucks in each of the units 110 and 111 can be readily made to properly drive the nails in the lid of the box of lesser width which the machine is being adjusted to accommodate.

The machine 20 can accommodate boxes varying in height within a certain range without any adjustment by virtue of the use of an elevator for lifting the boxes against the nailing mechanism in order to press and nail a lid on the box.

The machine 20 may be adjusted to vary this range, however, by removing the bolts 37, shifting the superstructure 23 either upwardly or downwardly relative to the base structure 22 of the machine, and then reconnecting the posts 36 to the base standards 31 and 32 with the bolts 37. One of the distinct advantages of the machine 20 is that this adjustment may be made by supporting the weight of the super-structure 23 on the jack 50 and then by careful manipulation of the foot pedal 187 (with a box in engagement with both of the stops 202—202') lift this box upwardly against the chuck beams 116 and until the chuck beams are lifted to their maximum upward position (this being done after the snap action rod 167 (Figs. 1 and 14) has been disconnected).

At this point the foot pedal 187 which is manipulated so that the jack 50 just supports the weight of the super-structure 23 whereupon the bolts 37 are removed by an assistant, following which further manipulation of the foot pedal 187 either lifts the superstructure 23 or lowers this until the nailing mechanism 25 is brought to its new desired vertical relation with the base structure 22 whereupon the assistant replaces the bolts 37 connecting together the posts 36 and the base standards 31 and 32. The vertical adjustment of the nailing mechanism 25 is now complete and the pedal 187 is released, permitting the elevator 52 to return to its downwardmost position, and the snap-action rod 167 is re-connected.

Arrival of a box being lidded at its upwardmost position in the lidder 20 causes a sudden increase in the load of the motor 41 during the moment that the box is held in this position prior to the opening of the valve 74. Where it is desired to eliminate this factor in the operation of the lidder 20, a hydraulic system 300, such as is diagrammatically illustrated in Fig. 13 is substituted for the pump unit 40. This includes a high volume pump 301 and a low volume pump 302 which are continuously driven and are located in the tank 68 and draw liquid therefrom in a similar manner as is the case with pump 69 as shown in Fig. 7. Pump 301 has a discharge line 303 leading to a pilot pressure control cut-out valve 304 which normally discharges through a line 305 having a check valve 306 from which a pipe 307 leads to valve 74. The pump 302 discharges into the pipe 307 and the pilot pipe 308 leads from pipe 307 to the pilot control valve 304.

In between lidding cycles the pumps 301 and 302 both discharge liquid through the pipe 307 and the valve 74 into the tank 68. When this valve is manipulated to start a lidding cycle, the output of both of the pumps is delivered to the jack 50. The volume of liquid discharged per second by the pump 302, however, is only about one-third that discharged by pump 301. The resistance created in the nailing operation to the upward travel of the elevator table increases rapidly during the nailing operation. This increases the pressure in the pilot pipe 308 and the valve 304 is set to be actuated to bypass the discharge from pump 301 into the tank 68 at a certain point in the nailing operation where it is desired to start slowing down the upward movement of the elevator table. Actuation of the valve 304 at this point cuts out the pump 301 and allows it to discharge through the valve 304 directly into the tank 68 so that the balance of the upward movement of the elevator in that lidding cycle is under the propulsion of the pump 302 alone. As the volume of liquid delivered by this pump is only one-quarter of the combined volume of the two pumps the cutting out of pump 301 has the effect of shifting gears from high gear to low gear on an automobile and greatly reduces the load imposed on the motor during the final upward movement of the elevator when the resistance to this movement is at its peak. The change in drive ratio covers such a small portion of the upward movement of the elevator that the use of hydraulic system 300 does not materially slow down the operation and yet it has the effect of smoothing out the load imposed on the motor and the power circuit leading thereto.

*Box feeding conveyor 315*

Figure 16:
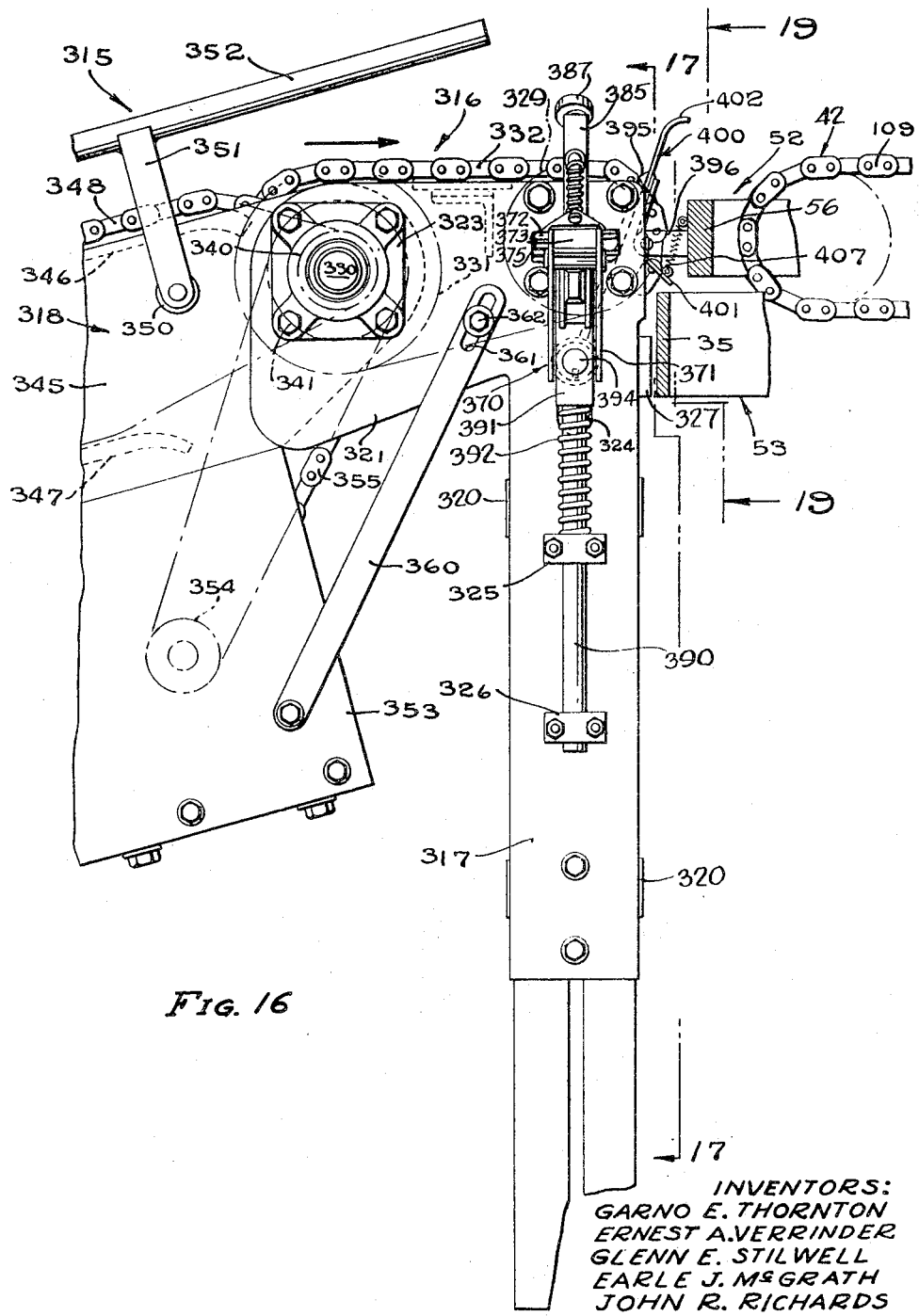
Fig. 16 is a fragmentary side elevational view of the delivery end of an accumulator conveyor for feeding boxes to the machine and shows the relation of the nailing table of the machine and a latch provided thereon with said accumulator just following the delivery of a box from the latter into said machine.

Although adapted to be fed by hand as above noted, the maximum capacity of the lid press and nailing machine 20 is attained only by associating an automatic box feeding conveyor 315 therewith (Figs. 16 to 21, inclusive). As indicated in Fig. 16, this conveyor is placed close to the base structure crossplate 35 so as to discharge boxes therefrom directly onto the lidder conveyor 42. The feed conveyor 315 includes a high speed delivery conveyor section 316 which is mounted on legs 317 which rest on the floor. The conveyor 315 also includes an accumulator section 318, one end of which is supported on the section 316 and the other end of which is supported on legs (not shown) which also rest on the floor.

The legs 317 are telescopic to permit adjustment in the length of these to bring the upper level of the conveyor 316 on the same level as the lidder conveyor 42 when the nailing table 52 is in its downward position.

The legs 317 are connected by crossplates 320 welded thereto and have lateral extensions 321 at their upper ends. Bearings 322 are mounted on inner faces of the legs 317 at their upper ends and bearings 323 are mounted on outer faces of said extensions. The legs 317 are provided with slots 324 and have slide bearings 325 and 326 fixed on their outer faces. Abutment blocks 327 are fixed on the front faces of the legs 317 opposite the plate 35 of the lidder 20 and are adapted to be brought into contact or very close to this plate to effect proper spacing of the feed conveyor 315 from the lidder 20.

Journalling in the bearings 322 is a shaft 328 having sprockets 329. Journalling in the bearings 323 is a shaft 330 having sprockets 331 which are connected with sprockets 329 by an endless chain 332. The shaft 330 also carries sprockets 340. Also fixed on the shaft 330 is a sprocket 341.

The accumulating conveyor section 318 has side frame members 345 which pivot on the shaft 330 and are provided on the inner faces thereof with chain guides 346 and 347. Conveyor section 318 has endless chains 348 which are guided by said guides and which are trained about and driven from the sprockets 340. Extending outwardly from the frame members 345 are box guide mounts 350 which are adjustable in length and carry at their ends members 351 which are welded at their upper ends to box guides 352. Supported on the lower edges of the frame members 345 is a motor mount 353 carrying a motor (not shown), the drive sprocket 354 of which is connected by an endless chain 355 with the sprocket 341 on the shaft 330 (Fig. 16). Pivoted on the motor mount 353 are a pair of links 360 having slots through which bolts 362 extend, the latter securing the upper ends of the links 360 to the legs 317 of the conveyor section 316 by permitting a limited amount of rotation of the conveyor section 318 relative to the section 316 within the range permitted by the slots 361.

Welded to the legs 317 (Figs. 17 and 18) and extending laterally therefrom are stop mounting brackets 370, each of which includes a pair of plates 371 which are secured together at their upper outer corners by bolts 372 extending through spaces 373. The plates 371 have horizontal slots 374 near their upper edges. Slidably fitting those slots and extending therethrough are bolts 375, each of these bolts extending through a sleeve 376 which slidably fits between the plates 371, said bolt also extending through suitable apertures in flanges 377 of a spring supporting bracket 378 having an aperture 379 at its outer end. Pivotally mounted on each of the sleeves 376 is a stop hub 380 having two arms 381 extending non-vertically downwardly therefrom to rotatably support a roller 382 between their lower ends. Extending vertically upward from each hub 380 is a stop mounting arm 385, the upper end 386 of which is bent inwardly and downwardly slightly therefrom to rotatably carry thereon a stop roller 387. Welded onto each arm 385 is an arcuate rod 388, the lower end of which extends through the aperture 379, a compression spring 389 being coiled about the rod 388 and trapped thereon between the arm 385 and the bracket 378.

Slidable vertically on bars 325 and 326 are shafts 390, the upper ends of which extend into and are secured in recesses formed in the head pieces 391, there being compression springs 392 coiled about the shafts 390 and trapped thereon between bars 325 and the heads 391. The heads 391 extend upwardly in sliding contact with the legs 317 and have control tracks 393 formed integrally therewith and extending horizontally therefrom. From each of the control tracks 393 extends the arms 381 of the adjacent stop 387 and just above the roller 382 so that the expansion of the spring 389 holds this roller upwardly against this control track. The heads 391 are apertured to receive upper ends of a cross shaft 394, the latter extending outwardly through the holes 324 in the legs 317. This shaft is fixed to these heads and has keyed thereon a member 395 which is inclined upwardly and outwardly as shown in Figs. 16 and 20.

When the machine 20 is equipped with an automatic box feeding conveyor 315, the adjacent front bar 56 of the nailing table 52 carries a yoke 396 formed by two outwardly extending spaced arms 396a and 396b which are rigidly attached to the bar 56. At their free ends, the arms 396a and 396b support a roller 397 which has reduced diameter ends 398 rotatably journaled in suitable apertures in the arms. A latching member 400 is carried by the nailing table 52 as it moves up and down in the lidding machine. This latching member 400 comprises a rigid metal strap 401, Figures 19 and 20, and a flag-like portion 402 that is secured, as by welding, to the upper end of the strap 401 and extends laterally therefrom. The strap is welded or brazed to the periphery of the roller 397 so that the latching member 400 may pivot about the axis of the roller.

Figure 19:
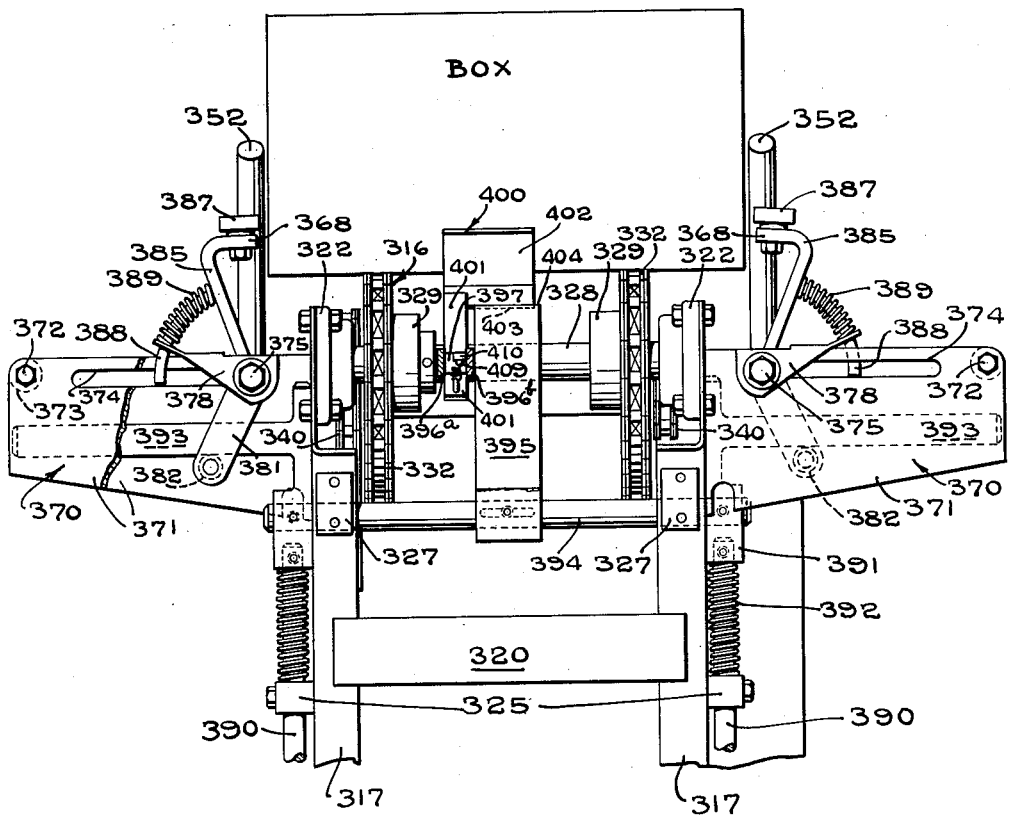
Fig. 19 is a vertical sectional view taken on line 19—19 of Fig. 16.

In Figures 19, 20 and 21, it will be seen that, as the latching member 400 moves downwardly with the nailing table, a flat abutment surface 403 (Fig. 19) on the lower end of the flag 402 contacts the upper flat end 404 of the member 395 at substantially the end in an operating cycle of the machine. The abutment surface 403 is normally held in axial alignment with the end 404 of the member 395 by a tension spring 407, Figure 20, that is attached between hooks disposed on the bar 56 and on the strap portion 401 of the latching member. The spring 407 urges the latching member in counterclockwise direction, as seen in Figure 20, to a fixed position determined by the abutment of a pin 499, extending radially from the roller 397, with a block 410 secured to and extending outwardly from the arm 396b. When the nailing table 52 is in lowered position and following the feeding of a box from the conveyor 315 into the lidder 20, the latching member 400 rests against the member 395 as shown in Figs. 16 and 21.

With the stop mechanism of the feed conveyor 315 positioned as shown in Figs. 16 and 17, the stops 387 are free to swing inward, as they are shown, in front of a box being conveyed on the feed conveyor 315 towards the machine 20. The chains 332 and 348 of the feed conveyor 315 are driven constantly so that a box advanced thereon at this time onto the section 316 engages the stops 387 and is held against advancing although the chains 332 continue to travel beneath the box.

Assuming that in this situation a box is already resting in the machine 20 to be lidded, the latter is actuated as above described to lid this box, this involving an upward and downward movement of the nailing table 52. As this table returns downwardly, the latching member 400 is held in the fixed position shown in Fig. 20 by the spring 399 so as to engage the upper end of the member 395 and pull this downwardly during a final portion of the downward movement of the elevator table. This depresses the control tracks 393 (Fig. 19) which act on the rollers 382 to swing the arms 381 so as to rotate the stops 387 out of the path of the box held thereby on the conveyor section 316. The withdrawal of stop 387 results in this box rapidly discharging from the feed conveyor 315 onto the lidder conveyor 42. As the box thus discharged passes over the flag portion 402 of the latching member 400, it swings this away from over the member 395 so that the latter is free to rise under the impulsion of the compression springs 392 thereby restoring the stops 387 to their positions in the path of boxes traveling on the conveyor section 316 and permitting the upper end of the member 395 to move to a point above the abutment surface 403 of the latching member as seen in Fig. 16. As the nailing table 52 moves upwardly during the next lidding operation, the flag 402 will be cammed in a clockwise direction, against the resistance of the spring 407, by the member 395.

By virtue of the difference in diameter of the sprockets 340 and 331 the surface speed of the conveyor section 316 is considerably in excess of that of section 318 thereby producing a gap between each box as it is discharged from the conveyor section 316 and the box next following it.

From the foregoing description, it is believed clear that by loosening the bolts 375, the stops 387 and their mounting assemblies may be shifted along the slots 374 and re-secured to the brackets 370 with any desired spaced relation between the stops 387. The box guides 352 being also adjustably mounted on the conveyor section 318 may be shifted on their mounting pipes 350 so as to alter their spacing to conform to the change effected in the spacing of the stop 387. This is clearly indicated by the broken-line representations of the stops 387 and the box guides 352 shown in Fig. 17.

It is to be noted that the control tracks 393 being mounted parallel with the slots 374 are effected to actuate the stops 387 regardless of the adjusted positions in which these stops are mounted on the brackets 370.

The claims are:

1. A box feeding conveyor comprising conveying members arranged to advance boxes in single file along a predetermined path, a bracket disposed on each side of the path of movement of the boxes and extending transversely of the path, each bracket having a slot therein, a lever pivotally mounted in each bracket slot, a stop element carried by each lever and arranged to be moved inwardly from a position at the side of said conveying members to a position in the path of movement of a box being advanced on said members, and adjustable means for clamping each pivotal lever in the slot of the associated bracket whereby the distance between said levers may be varied to accommodate boxes varying in width.

2. In combination, a machine having a vertically movable work supporting table, a feed conveyor mounted adjacent said table and arranged to deliver items consecutively onto said table, said feed conveyor having a continuously moving conveying surface adapted to frictionally engage and move items placed thereon, a support structure provided with laterally extending portions having stop means mounted thereon for movement between a position obstructing the movement of items from said feed conveyor to said table and a position removed from the path of said items, means reciprocably mounted on said support structure and operatively connected to said stop means to move said stop means between said two positions upon reciprocation of said reciprocable means, a latch pivotally mounted on said table having an abutment surface arranged to contact said reciprocable means as said table descends to said discharge position urging said reciprocable means in a direction to move said stop means to said removed position, the movement of said stop means to said removed position being effective to permit said continuously moving conveying surface to move an item onto said table, said latch having an upstanding portion in the path of the item as it moves onto said table, said upstanding portion being constructed and arrange to be pivoted by the contact of said item therewith to move said latch abutment surface out of engagement with said reciprocable means, and means for returning said stop means to item obstructing position after said latch abutting surface is disengaged from said reciprocable means.

3. A box feeding conveyor comprising conveying members arranged to advance boxes in single file along a predetermined path, a bracket disposed on each side of the path of movement of the boxes and extending transversely of the path, each bracket having a slot therein, a lever pivotally mounted in each bracket slot, a stop element carried by each lever and arranged to be moved inwardly from a position at the side of said conveying members to a position in the path of movement of a box being advanced on said members, and adjustable means for clamping each pivotal lever in the slot of the associated bracket whereby the distance between said levers may be varied to accommodate boxes varying in width, spring means arranged to urge said levers toward box-intercepting position, a reciprocable control member operatively engaged with said levers and arranged to simultaneously move said levers out of box-intercepting position against the resistance of said spring means.

4. A box feeding conveyor comprising conveying means for moving a box along a predetermined path, stop means movable from a position withdrawn from the path of movement of a box to a position in said path to arrest the movement of said box, resilient means normally urging said stop means to box arresting position, actuating means for moving said stop means to withdrawn position against the resistance of said resilient means, a latch member movable into engagement with said actuating means to move said actuating means in a direction to move said stop means to withdrawn position and to latch said actuating mechanism to hold said stop means in said withdrawn position, and means on said latch member disposed in the path of movement of a box advanced by said conveying means to be contacted by said box and moved out of latching engagement with said actuating means.

5. A box feeding conveyor comprising conveying members arranged to advance boxes in single file along a predetermined path, a bracket disposed on each side of the path of movement of the boxes and extending transversely of the path, each bracket having a slot therein, a lever pivotally mounted in each bracket slot, a stop element carried by each lever and arranged to be moved inwardly from a position at the side of said conveying members to a position in the path of movement of a box being advanced on said members, an actuating mechanism operatively connected to said levers to move said levers simultaneously, and a vertically movable control member arranged to engage said mechanism to actuate the same and move said levers to a position withdrawn from the path of the box.

References Cited in the file of this patent

UNITED STATES PATENTS

| | | |
|---|---|---|
| 1,939,985 | Keech | Dec. 19, 1933 |
| 1,963,377 | Paxton | June 19, 1934 |
| 2,033,865 | Platt | Mar. 10, 1936 |
| 2,084,048 | Paxton | June 15, 1937 |
| 2,128,963 | Paxton | Sept. 6, 1938 |
| 2,128,972 | Stebler | Sept. 6, 1938 |
| 2,371,926 | Schmitt | Mar. 20, 1945 |

FOREIGN PATENTS

| | | |
|---|---|---|
| 556,822 | Great Britain | Oct. 22, 1943 |